(12) United States Patent
Knowles et al.

(10) Patent No.: US 6,539,970 B1
(45) Date of Patent: Apr. 1, 2003

(54) METHOD AND APPARATUS FOR SERVICING A PRESSURIZED SYSTEM

(75) Inventors: Steven M. Knowles, Silver Lake, IN (US); Terrence D. Kalley, Troy, MI (US)

(73) Assignee: Prime Solutions, LLC, Troy, MI (US)

( * ) Notice: Subject to any disclaimer, the term of this patent is extended or adjusted under 35 U.S.C. 154(b) by 0 days.

(21) Appl. No.: 09/422,236

(22) Filed: Oct. 21, 1999

(51) Int. Cl.$^7$ .................. B08B 5/00; F16L 55/07; F16L 37/28; F25B 45/00; F16K 11/20

(52) U.S. Cl. ................ 137/238; 62/50.7; 62/149; 62/292; 137/15.04; 137/614; 137/614.11; 137/614.19; 137/636.4; 137/637

(58) Field of Search ............. 137/240, 614.05, 137/238, 614, 636.4, 637.4, 614.03, 614.19, 15.04, 15.05, 637, 614.11; 62/149, 50.7, 292; 251/149.6, 149.4

(56) References Cited

U.S. PATENT DOCUMENTS

| | | | |
|---|---|---|---|
| 4,008,716 A | * | 2/1977 | Amlong ................ 137/614.19 |
| 4,182,370 A | * | 1/1980 | Karcher ................ 137/614.03 |
| 4,261,178 A | | 4/1981 | Cain ........................... 62/149 |
| 4,338,793 A | * | 7/1982 | O'Hern ....................... 62/292 |
| 4,449,545 A | | 5/1984 | Vernor et al. ............ 251/149.9 |
| 5,005,369 A | | 4/1991 | Manz ........................ 62/195 |
| 5,005,375 A | | 4/1991 | Manz et al. ............... 62/292 |
| 5,063,749 A | | 11/1991 | Manz ......................... 62/149 |
| 5,080,132 A | * | 1/1992 | Manz et al. ........... 137/614.04 |
| 5,148,839 A | * | 9/1992 | Kirwan et al. ............. 137/614 |
| 5,169,192 A | | 12/1992 | Allison et al. ............. 294/64.1 |
| 5,181,391 A | | 1/1993 | Manz ......................... 62/129 |
| 5,193,351 A | | 3/1993 | Laukhuf et al. .............. 62/77 |
| 5,244,010 A | | 9/1993 | Barjasteh et al. ....... 137/614.05 |
| 5,261,249 A | | 11/1993 | Manz et al. ................ 62/149 |
| 5,285,647 A | | 2/1994 | Manz et al. ................ 62/127 |
| 5,289,850 A | * | 3/1994 | Sarson et al. ............... 137/614 |
| 5,367,886 A | | 11/1994 | Manz et al. ................ 62/195 |
| 5,370,359 A | | 12/1994 | Sadegh et al. ............ 251/276 |
| 5,388,416 A | | 2/1995 | Manz et al. .................. 62/85 |
| 5,450,875 A | | 9/1995 | Chichester et al. ..... 137/614.05 |
| 5,493,869 A | | 2/1996 | Shirley et al. .............. 62/149 |
| 5,517,825 A | | 5/1996 | Manz et al. ................ 62/158 |
| 5,544,492 A | | 8/1996 | Manz .......................... 62/85 |
| 5,544,494 A | | 8/1996 | Manz et al. ................ 62/292 |
| 5,603,223 A | | 2/1997 | Murray et al. ............... 62/84 |
| 5,906,106 A | | 5/1999 | Brown et al. .............. 62/195 |
| 6,041,818 A | * | 3/2000 | Schadewald et al. .. 137/614.19 |
| 6,230,737 B1 | * | 5/2001 | Notaro et al. .......... 137/614.19 |
| 6,269,840 B1 | * | 8/2001 | Beaver ..................... 137/637.4 |

FOREIGN PATENT DOCUMENTS

| | | |
|---|---|---|
| DE | 695491 | 7/1940 |
| DE | 2313188 | 9/1974 |
| FR | 377682 | 7/1907 |
| GB | 449261 | 6/1936 |

\* cited by examiner

*Primary Examiner*—George L. Walton
(74) *Attorney, Agent, or Firm*—Fish & Richardson P.C.

(57) ABSTRACT

A method and apparatus for servicing a pressurized system is described. A purge fitting can be used to vent the pressurized system. Venting can release a gas, such as air, from the system. The pressurized system can be a climate control system (e.g., an air conditioning or refrigeration system), a brake system, a hydraulic system, or a service device for servicing a climate control system. The purge fitting allows air that may be trapped in the pressurized system to be vented by depressing a purge actuator, such as a purge button attached to the fitting. The air can be vented from an opening adjacent to the actuator or other orifice. By purging air directly from the system, the amount of air introduced into the system during servicing can be minimized. The invention also features a coupling member that can be compact in size. The coupling member can include a self-sealing valve assembly that prevents opening the coupling member until a proper coupling interconnection with a system to be serviced has taken place. The purge fitting can be incorporated in the coupling member or other service device.

24 Claims, 11 Drawing Sheets

METHOD AND APPARATUS FOR SERVICING A PRESSURIZED SYSTEM

BACKGROUND OF THE INVENTION

The present invention relates to a method and apparatus for servicing a pressurized system, in particular an air conditioning or refrigeration system.

Servicing couplings are commonly employed to facilitate charging and evacuation of a pressurized fluid system, such as a refrigeration system, an air conditioning system, or a hydraulic system. The service coupling connects to a service port of the system. The service coupling opens a service port of a system, allowing fluids, including liquids or gases, to be exchanged with the system. A quick-release interconnection between the service port and the service adapter can facilitate the servicing process. For example, when servicing a refrigeration or air conditioning system the service coupling can be connected by a flexible hose to a refrigerant supply source, such as a pressurized bottle or cylinder. When the service coupling and service port is opened, refrigerant can flow through the coupling and into the refrigeration system. Because pressurized fluid systems can be serviced when the system is installed in a confined space such as a vehicle, service couplings having small dimensions can be useful for convenient servicing.

In order to maintain the performance of a pressurized fluid system, it can be important to keep air out of the system. In air conditioning systems, for example, system performance can deteriorate when air is in the system. In addition, introduction of air can also lead to introduction of moisture and other contaminants into the system. Thus, keeping air out of the system can be important when servicing a system.

SUMMARY OF THE INVENTION

The invention features a purge fitting for venting a pressurized system. Venting can release a gas, such as air, from the system. The pressurized system can be a climate control system (e.g., an air conditioning or refrigeration system), a brake system, a hydraulic system, or a service device for servicing a climate control system. The purge fitting allows air that may be trapped in the pressurized system to be vented by depressing a purge actuator, such as a purge button attached to the fitting. The air can be vented from an opening adjacent to the actuator or other orifice. By purging air directly from the system, the amount of air introduced into the system during servicing can be minimized. The service device can be a coupling member or a service unit. The invention also features a coupling member that can be compact in size. The coupling member can include a self-sealing valve assembly that prevents opening the coupling member until a proper coupling interconnection with a system to be serviced has taken place. The purge fitting can be incorporated in the coupling member or other service device.

In one aspect, the invention features a coupling member. The coupling member includes a body having a first end engageable with a first valve, a second end having a moveable control member, an inner surface defining an interior chamber, and a port in fluid communication with the interior chamber. The first valve can be a service port. The coupling member also includes a pusher disposed in the interior chamber and in contact with the control member. The pusher has a valve actuation portion extending toward the first end of the body. The pusher is movable by the control member from a valve closed position to a valve open position. The coupling member also includes a pin depressor proximate to the port having a first position oriented closer to the interior chamber relative to a second position which is closer to the port. The pin depressor moves from the first position to the second position when the first valve is engaged with the first of the body and the pusher is moved from the valve closed position to the valve open position. The pin depressor is in the first position when the first en of the body is not engaged with the first valve and the pusher is moved from the valve closed position to the valve open position.

The pusher can be engaged with threads to the control member. The pusher can move from the valve closed position to the valve open position by rotating the control member by less than one revolution. The second end of the body can include a groove. The control member can be moveably attached to the groove. Attachment can be made by a pin assembly, a set screw, or a snap ring.

The coupling member can also include a valve detection member movably disposed on the valve actuation portion. The valve detection member can be rotatably or slidably disposed on the valve actuation portion. The valve detection member moves relative to the valve actuation portion when the first valve is engaged with the first end of the body and the pusher is moved from the valve closed position to the valve open portion. The valve detection member is substantially stationary relative to the valve actuation portion when the first end of the body is not engaged with the first valve. The pin depressor moves from the first position to the second position when the valve detection member moves relative to the valve actuation portion.

The coupling member can include a second valve positioned within the port. The second valve is opened when the pin depressor moves from the first position to the second position. The first end can be engageable with a high pressure side refrigerant port or a low pressure side refrigerant port.

In preferred embodiments, the pin depressor is movably attached to the pusher.

In other preferred embodiments, the first end of the body includes a release sleeve assembly including an adapter connected to the first end of the body, a release sleeve over the adapter, and a spring between the release sleeve and the adapter. The adapter can be connected by threads, pins, one or more set screws, a snap ring, brazing, or soldering. The release sleeve assembly can include a plurality of balls distributed between the adapter and the sleeve. The balls are engageable with the first valve. The plurality of balls can include more than six balls (e.g., eight balls).

In other preferred embodiments, the coupling member includes a purge actuator exterior to the body. The purge actuator has a shaft extending through the interior chamber to the port. The shaft is capable of moving the pin depressor from the first position to the second position while in the valve closed position. In certain embodiments, the pusher can include a stop that prevents the shaft from moving the pin depressor when in the valve open position.

The purge actuator can include a button, a switch, a lever, a knob, or a rocker.

In preferred embodiments, the coupling member has an end-to-end dimension T that is unchanged in the valve open position and in the valve closed position.

In another aspect, the invention features a coupling member including a first end engageable with a service port, a valve within the coupling member, and a purge actuator capable of opening the valve. The coupling member can also include a service port detection member movably disposed within the coupling member. The service port detection member opens the valve when the service port is engaged with the first end. The port detection member does not open the valve when the first end is not engaged with the service port. The coupling member can be a release sleeve assembly at the first end including an adapter connected to the first end, a release sleeve over the adapter, and a spring between the release sleeve and the adapter.

In another aspect, the invention features a purge fitting. The purge fitting includes a body having a fluid inlet, a fluid outlet, and a vent port. The purge fitting also can include a purge actuator exterior to the body. The purge actuator has an open position and a closed position. The purge actuator seals the vent port when the actuator is in the closed position. The seal is broken and the vent port is opened when the purge actuator is in the open position. The fluid inlet and the fluid outlet are in fluid communication when the purge actuator is in the closed position, and the vent port, the fluid inlet and the fluid outlet are in fluid communication when the purge actuator is in the open position. Flow between the fluid inlet and the fluid outlet is substantially unrestricted when the purge actuator is in the open position and the closed position.

The purge actuator can include a shaft extending into the body to a shaft retaining member. The purge actuator can have a diameter that covers the vent port without blocking fluid flow. The body of the purge fitting can be a portion of a coupling member, a portion of a hydraulic system, a brake system, or a portion of a climate control system service unit. The service unit can be a service manifold, a valve core removal tool, a refrigerant cylinder, a fluid charge line, such as a hose, a refrigerant identifier or analyzer, a diagnosis instrument, a dye injector, a recovery and recycle station, or other device that can connect to a service port of a system.

In yet another aspect, the invention features a method of servicing a pressurized fluid system. The method includes attaching a coupling member to a service port of the system, the coupling member being connected to a service unit and including a safety valve, and opening the service port with the coupling member. The safety valve is opened by a valve detection member in the coupling member approximately when the service port is opened. The coupling member or the service unit can include a purge actuator. The purge actuator or coupling member can be manually activated or automatically activated by, for example, a control circuit. The method can include activating the purge actuator to vent air from the service unit prior to attaching the coupling member to the service port or prior to opening the service port. The service port can be a high pressure side refrigerant port or a low pressure side refrigerant port.

In yet another embodiment, the invention features a method of venting a pressurized system including moving a purge actuator from a closed position to an open position. The purge actuator can be a portion of a purge fitting or a portion of a coupling member. The pressurized system can be a service device or a climate control system. The climate control system can be an air conditioning system or a refrigeration system.

The method and apparatus of the invention can assist in the servicing of pressurized systems, such as air conditioning or refrigeration systems. The coupling member includes a self-sealing mechanism that can prevent or reduce refrigerant loss and injury in the event the coupler is accidentally disconnected under pressure. In addition, the coupling member can be constructed so that the control knob opens and closes the service port of the system in less than a complete revolution (i.e., in one half to two thirds of a complete revolution). The coupling member has a short length and small diameter, which can facilitate access to the service port in tight spaces. In addition, the coupling member can engage with the service port of the system using a release sleeve assembly including more than six steel balls (e.g., eight balls). Six or more balls increase stability and grip of the member with the valve. The coupling member can have a length (T) of about 1.6 inches that remains unchanged when the coupling is in the open and closed positions, and a diameter of about 1.1 inches. These dimensions can allow the coupling to mate with service ports in confined locations. The coupling member can be adapted to mate with Society of Automotive Engineers (SAE)-dimensioned ports and can be constructed from metal, such as, for example, brass, steel, stainless steel, or aluminum, for durability.

The method and apparatus of the invention can also include a purge feature that can facilitate servicing pressurized systems. The purge feature can be a purge fitting attached to a service device or a purge actuator incorporated into a device such as a coupling member. The purge feature can reduce or eliminate problems related to introducing air into pressurized fluid systems. The purge feature allows air to be vented in a relatively controlled manner while protecting the user from exposure to the fluid in the system. For example, a purge fitting can be attached to a recovery and recycle machine, a refrigerant cylinder, or a manifold gauge set, or a portion thereof. The purge fitting can attach to a standard hose fitting. The purge fitting can be constructed from metal, a plastic, or a composite. The purge feature can allow air to be vented from hoses and other parts of a service device prior to working on the system. The purge feature can prevent air from entering the system. Air can be vented from an air conditioning system service device during servicing by depressing the purge actuator. At the first sound or sign of refrigerant near the purge vent, the purge actuator can be released, stopping flow of the refrigerant nearly instantaneously. The purge feature can improve the safety of servicing a pressurized system. For example, the purge can help prevent or reduce release of fluids (e.g., liquids or gases), such as refrigerants, from the system or service device. In addition the purge feature can be configured to help protect the user from refrigerant freeze and reduce the duration of servicing.

Additional features and advantages of the invention will become apparent from the detailed description of the invention.

DETAILED DESCRIPTION OF THE PREFERRED EMBODIMENT

Referring to FIGS. 1–3,5, and 6, coupling member 2 includes body 4. Body 4 has first end 6 attached to release sleeve assembly 8. Release sleeve assembly 8 includes adapter 10 which is attached by threads to first end 6. Alternatively, adapter 10 can be attached to first end 6 by pins, set screws, a snap ring, brazing, soldering, or swaging. O-ring 11 provides a fluid-tight seal between adapter 10 and body 4. Release sleeve 12 slides over adapter 10. Retaining ring 14 holds release sleeve 12 over adapter 10. Release sleeve spring 16 resides between release sleeve 12 and adapter 10 and pushes release sleeve 12 against retaining ring 14. When pushed against retaining ring 14, release sleeve 12 holds balls 18 within adapter 10. Balls 18 are distributed around the circumference of adapter 10. First end 6 includes orifice 20, which can receive a service port, which includes a valve, of a pressurized system. Balls 18 engage with the service port when the port is inserted into orifice 20. O-ring 21 is disposed within orifice 20 and is imbedded in adapter 10 to provide a fluid-tight seal between coupling member 2 and the service port.

Body 4 also has a second end 22 having control knob 24. Second end 22 has a groove 26 into which pins 28 and 30 fit. Pins 28 and 30 affix control knob 24 to body 4 so that control knob 24 can rotate about the longitudinal axis of coupling member 2. O-ring 32 forms a fluid-tight seal between body 4 and control knob 24.

Control knob 24 has inner threaded surface 34 that contacts outer threaded surface 36 of pusher 40. Pusher 40 is disposed in interior chamber 42 of body 4. Interior chamber 42 is defined by inner surface 44 of body 4. Pusher 40 has valve actuation portion 46 extending toward first end 6 and orifice 20. Valve actuation portion 46 supports valve detection member 48. Valve detection member 48 is a ring surrounding valve actuation portion 46 and is slidably disposed on valve actuation portion 46. Valve detection member 48 is held on valve actuation portion 46 by retaining ring 50. Spring 52, also located on valve actuation portion 46 biases valve detection member 48 along valve actuation portion 46 toward retaining ring 50.

Figure 4:
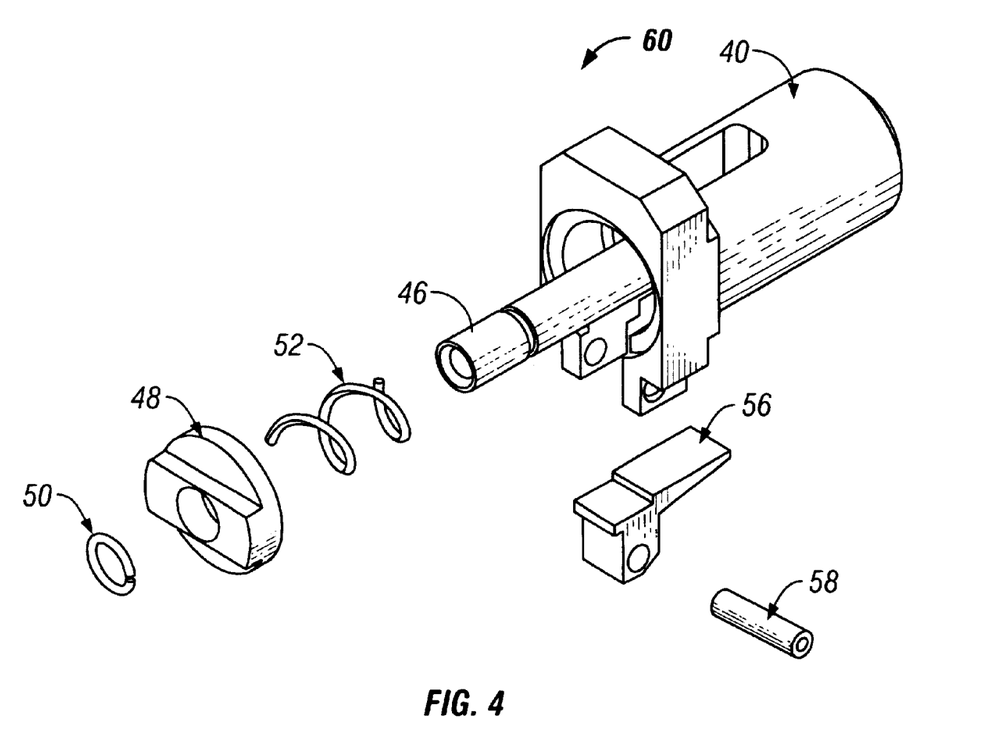
FIG. 4 is a schematic drawing depicting an exploded view of a pusher and pin depressor assembly.

Body 4 also includes port 54, which is in fluid communication with interior chamber 42 and orifice 20. Pin depressor 56 is located within interior chamber 42 and proximate to port 54. Pin depressor 56 is fixed to pusher 40 by roll pin 58. Pin depressor 56 can rotate about roll pin 58. Referring to FIG. 4, pusher 40, having valve actuation portion 46, valve detection member 48, retaining ring 50, spring 52, pin depressor 56, and roll pin 58 form dual-valve opening assembly 60.

In certain embodiments, shown in FIGS. 2, 3, 5 and 6, port 54 includes outlet port 62. Outlet port 62 can be a 14 mm connector (as shown). The connector can be combined with a 14 mm male port, a 14 mm female port, a ¼ inch male flare port, a ¼ inch female flare port, a ⅜ inch male flare port, a ⅜ inch female flare port, a ½ inch ACME male port, or a ½ inch ACME female port. O-ring 64 provides a fluid-tight seal between outlet port 62 and body 4. Outlet port 62 includes valve 66 within port 54. Valve 66 has poppet 68 which opens valve 66 when depressed. Poppet 68 extends toward pin depressor 56.

Referring to FIGS. 2, 3, 5 and 6, coupling member 2 is connected to service port 70. Service port 70 is inserted into orifice 20. O-ring 21 forms a fluid-tight seal with service port surface 72. Service port 70 contains Schrader-type valve 74. Valve 74 can be a primary seal-type valve. Schrader-type valve 74 has pin 76 which opens the valve when pressed into the valve. Coupling member 2 is configured so that valve 66 operates as a safety valve and does not open unless service port 70 is inserted into orifice 20. This feature reduces the likelihood or prevents opening the coupling and allowing refrigerant to escape when the coupling member is not connected to the system. This feature also can ensure that the coupling member closes if it is accidentally disconnected while in the open position and can make it easier to connect to a system under pressure.

Figure 5:
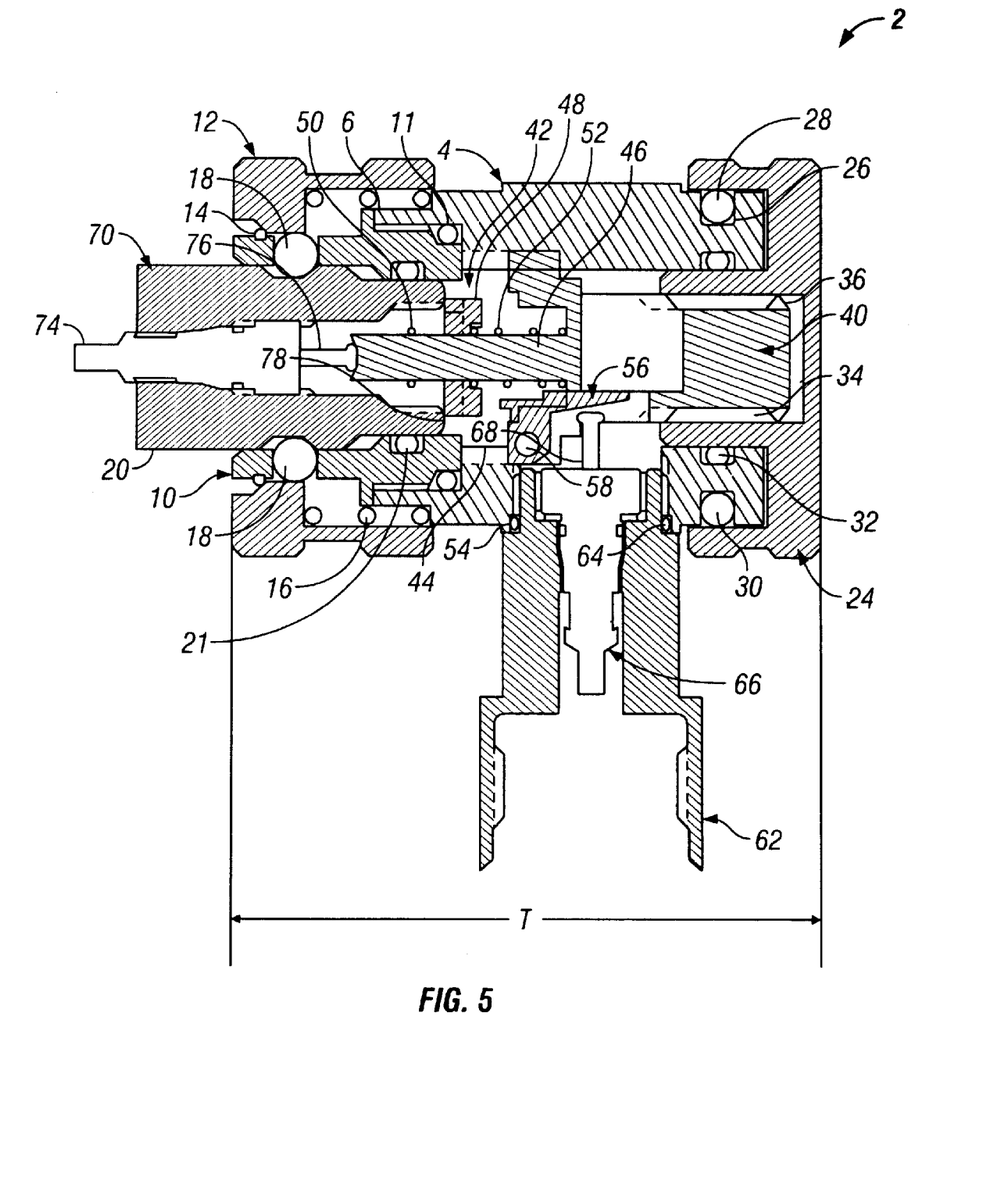
FIG. 5 is a schematic drawing depicting a sectional view of a coupling member in a valve closed position.
Figure 6:
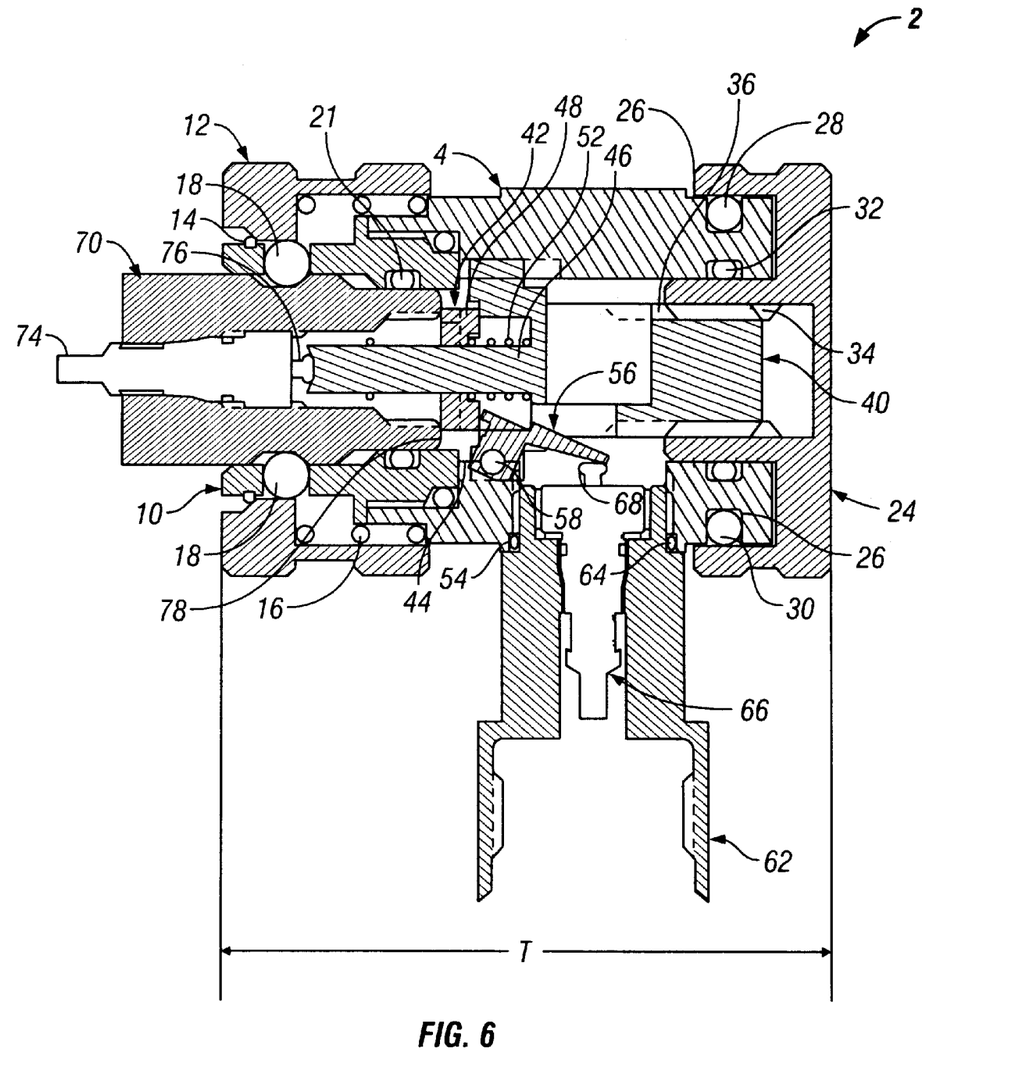
FIG. 6 is a schematic drawing depicting a sectional view of a coupling member in a valve open position.

In operation, rotation of control knob 24 moves pusher 40 toward orifice 20 from a valve closed position (shown in FIG. 5) to a valve open position (shown in FIG. 6). When pusher 40 moves from the valve closed position to the valve open position, valve actuation portion 46 contacts pin 76, depressing it and opening valve 74. Referring to FIG. 6, as pusher 40 moves toward orifice 20, valve detection member 48 contacts tip 78 of service port 70. Valve detection member 48 is oriented so that tip 78 prevents further movement of valve detection member 48. As a result, valve detection member 48 slides along valve actuation portion 46, compressing spring 52. As pusher 40 moves and opens valve 74, pin depressor 56 moves toward and contacts valve detection member 48. When this contact occurs, pin depressor 56 moves from a first position, shown in FIG. 5 in which valve 66 is closed and pin depressor 56 is within interior chamber 42, to a second position, shown in FIG. 6 in which pin depressor 56 extends partially into port 54, depressing poppet 68 and opening valve 66. If service port 70 is not inserted into orifice 20, then valve detection member 48 will not contact pin depressor 56 and valve 66 will not be opened.

Control knob 24 and pusher 40 are threaded so that pusher 40 moves from the valve closed position to the valve open position in less than one complete revolution of the knob, preferably about one-half of a complete revolution of the knob. The external dimensions of the coupling member do not change when in the open or closed position; the control member is not displaced relative to the body. Referring to FIGS. 5 and 6, because control knob 24 is attached to body 4 by pins 28 and 30 in groove 26, the length T of the coupling member does not change when the control member is opened and closed. Preferably, T is less than about 8 inches, more preferably less than about 1.7 inches, and most preferably about 1.6 inches. This feature allows the coupling member to be used in tight spots, since it occupies the same amount of space in the valve open position and the valve closed position.

Figure 1:
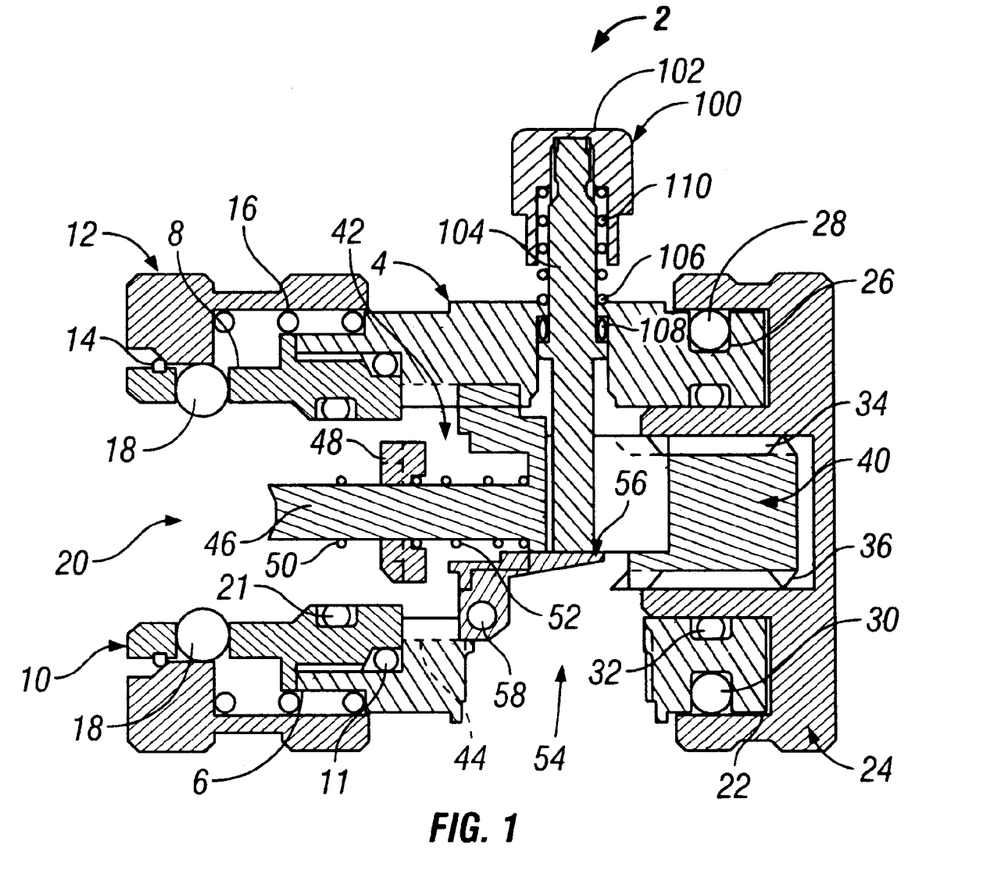
FIG. 1 is a schematic drawing depicting a sectional view of a coupling member having a purge actuator.
Figure 2:
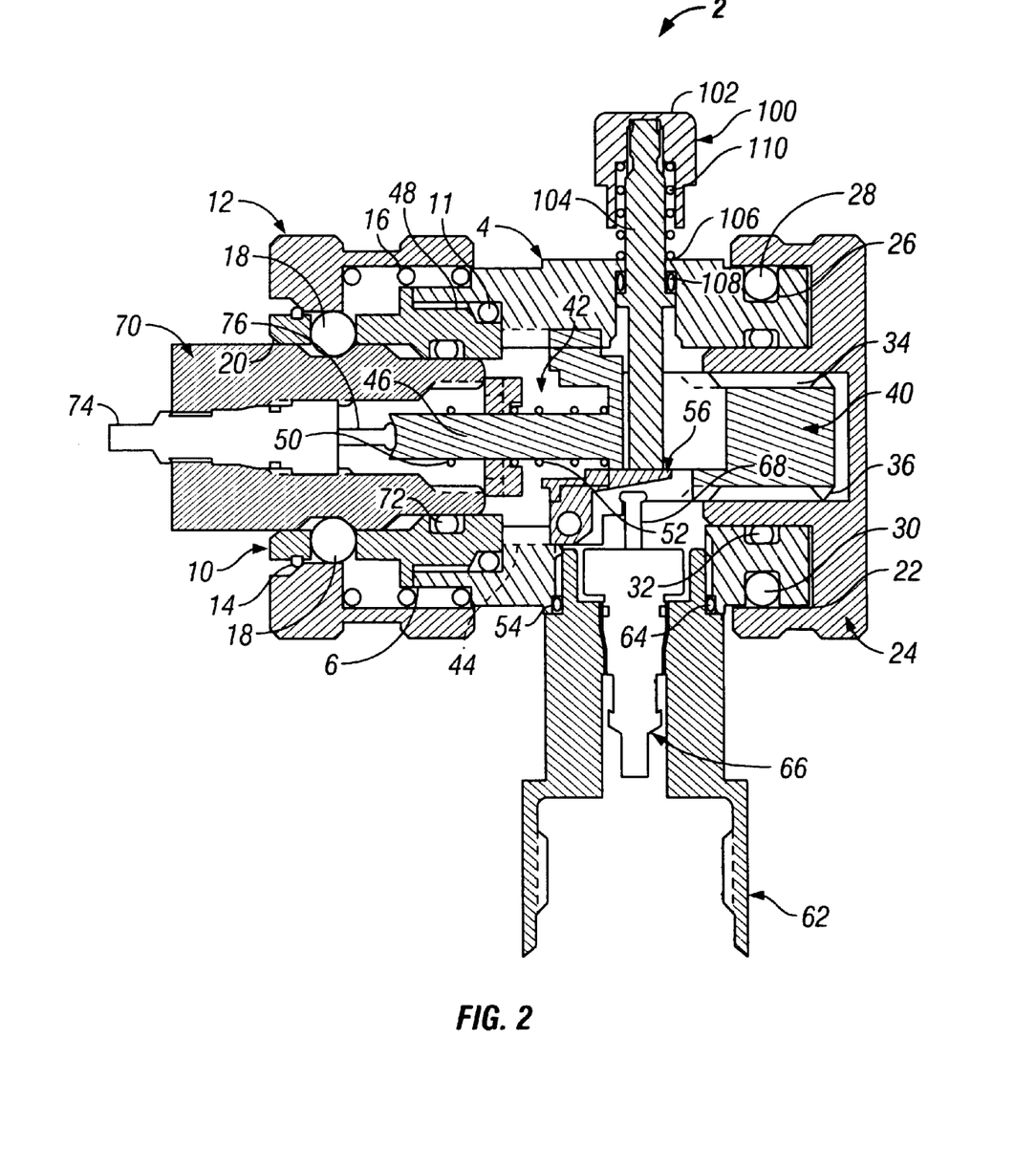
FIG. 2 is a schematic drawing depicting a sectional view of a coupling member having purge actuator and engaged with a port.
Figure 3:
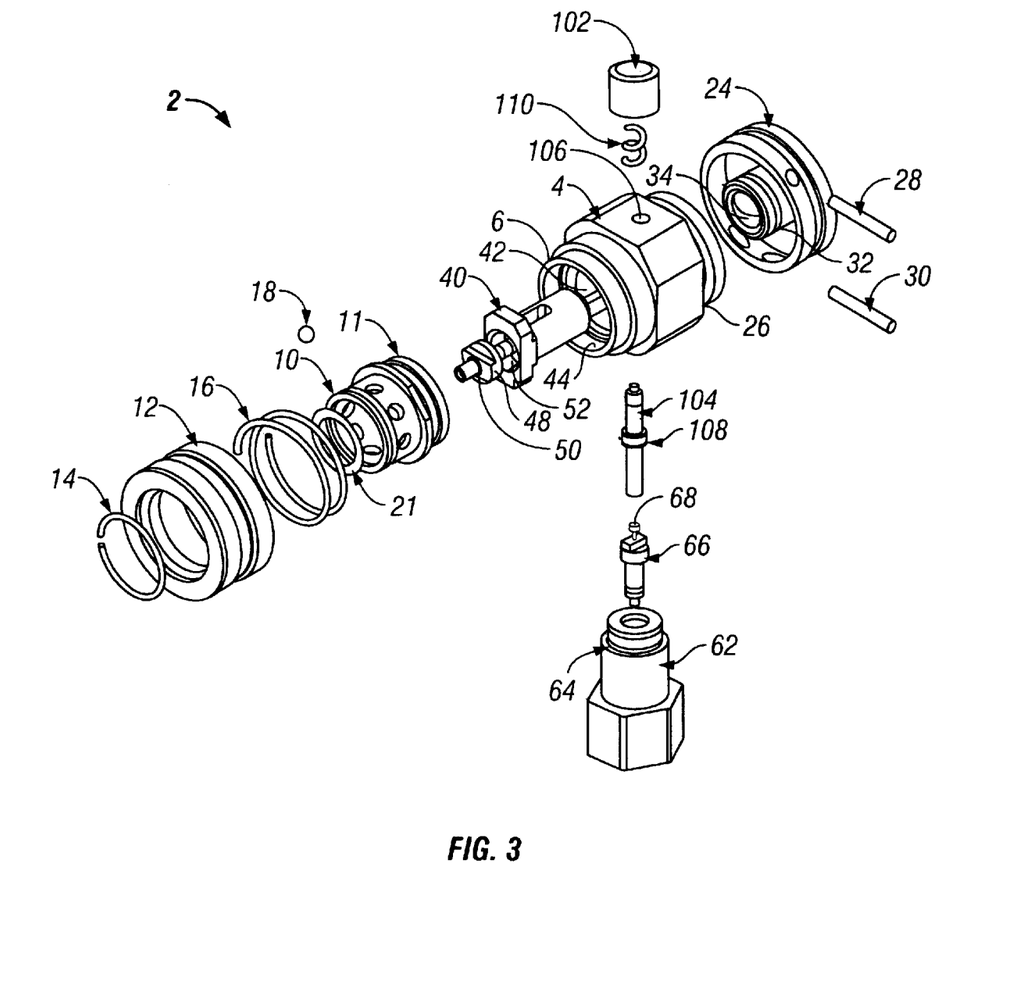
FIG. 3 is a schematic drawing depicting an exploded view of a coupling member having purge actuator.

Referring to the embodiment of FIGS. 1–3, coupling member 2 includes purge actuator assembly 100. Purge assembly 100 includes cap 102 and shaft 104 which enters opening 106 in body 4 and extends through chamber 42. O-ring 108 provides a fluid-tight seal between shaft 104 and body 4. Shaft 104 extends to pin depressor 56. Spring 110 biases purge assembly 100 away from body 4. When purge assembly 100 is pressed inward, shaft 104 moves pin depressor 56. As shown in FIG. 2, this motion will cause pin depressor 56 to contact poppet 68, opening valve 66. When outlet port 62 is attached to a pressurized fluid source by a conduit, such as a hose, pressing the purge assembly allows air to be vented from the conduit and from the coupling member as the pressurized fluid moves into the coupling member.

Figure 7:
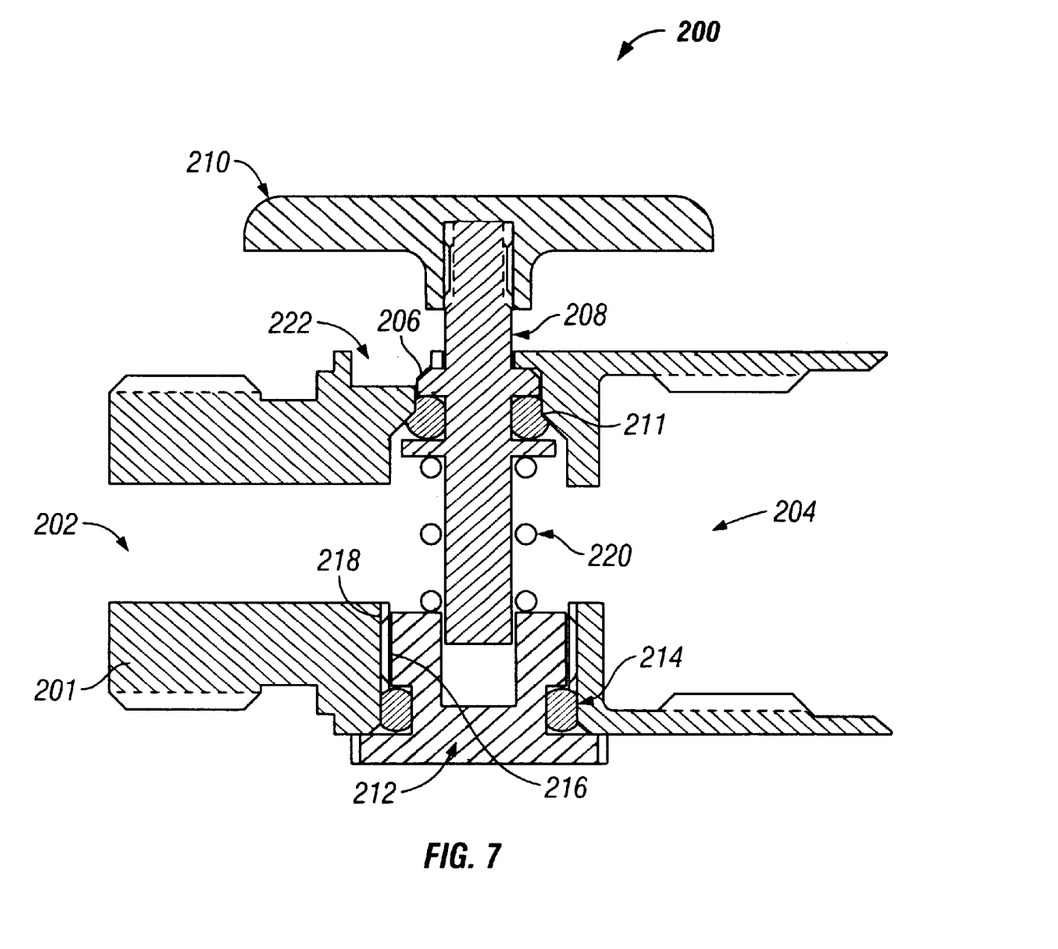
FIG. 7 is a schematic drawing depicting a sectional view of a purge fitting in a closed position.
Figure 8:
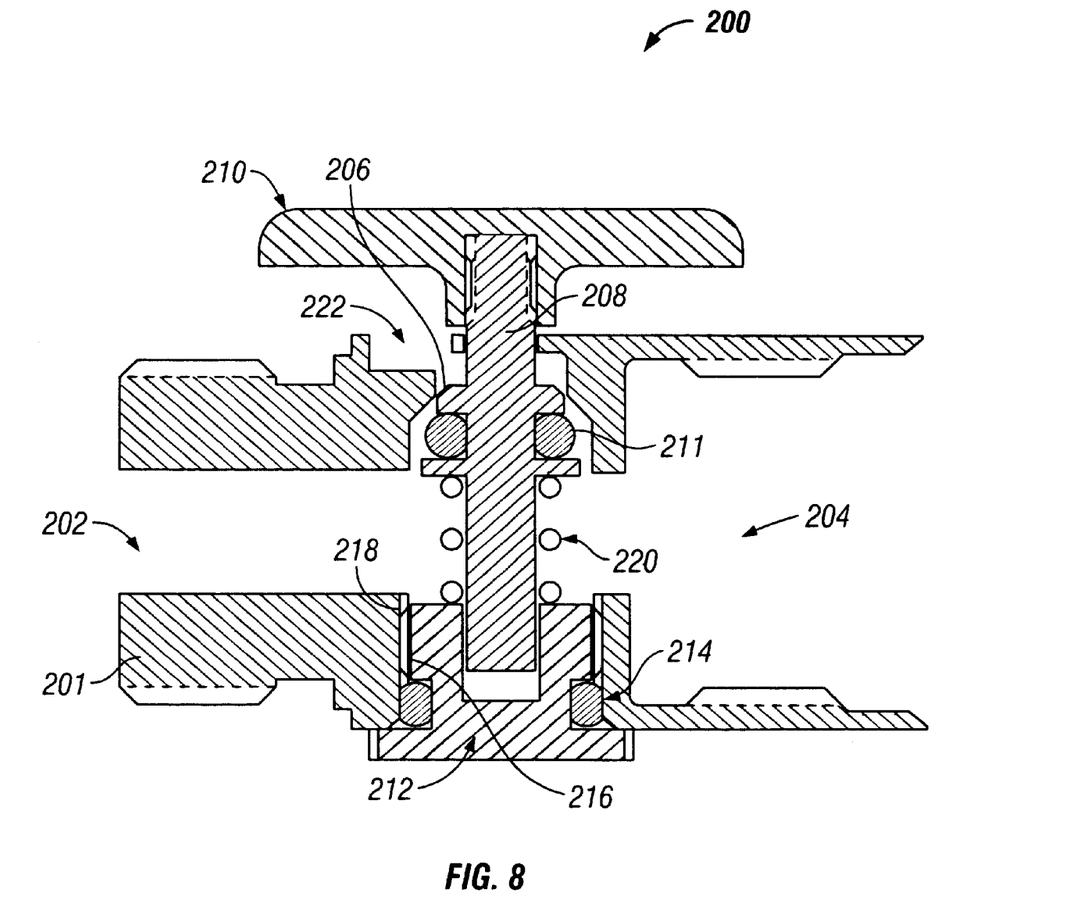
FIG. 8 is a schematic drawing depicting a sectional view of a purge fitting in an open position.

The purge feature can be attached to an existing pressurized fluid service device using a purge fitting, or it can be incorporated directly into a service device. Referring to FIGS. 7 and 8, purge fitting 200 has body 201. Body 201 has fluid inlet 202, fluid outlet 204, and vent port 206. Fluid inlet 202 and fluid outlet 204 function interchangeably, depending on the direction of fluid flow through the device. Purge shaft 208 is attached to purge button 210 and extends into body 201. O-ring 211 is seated on purge shaft 208. Purge shaft 208 is seated in a recess in plug 212 on the opposite side of body 201. Plug 212 is sealed to body 201 by O-ring 214. Plug 216 has an outward threaded surface 216 that engages with inward threaded surface 218 of body 201. Spring 220 is located along purge shaft 208.

The purge fitting has a closed position, shown in FIG. 7, and an open position, shown in FIG. 8. Spring 220 biases purge shaft 208 to the closed position. Referring to FIG. 7, O-ring 211 provides a fluid-tight seal between purge shaft 208 and body 201. In the closed position, fluid inlet 202 and fluid outlet 204 are in fluid communication. Referring to FIG. 8, when purge button 210 is depressed to open the purge fitting, O-ring 211 separates from body 201, allowing fluid communication between fluid inlet 202, fluid outlet 204, and vent port 206. When purge button 210 is depressed to that the purge fitting is opened, button 210 covers orifice 222 through which air is vented via vent port 206. By covering orifice 222 when the purge fitting is opened, button 210 protects the user from direct contact with the fluid if fluid happens to be discharged through vent port 206. Body 201 is recessed at the position of the purge shaft 208 and O-ring 211 so that the cross-sectional area within body 201 is substantially unchanged when the purge fitting is opened and closed. As a result, fluid communication between fluid inlet 202 and fluid outlet 204 is substantially unrestricted when the purge button is in the open position and the closed position.

Figure 9:
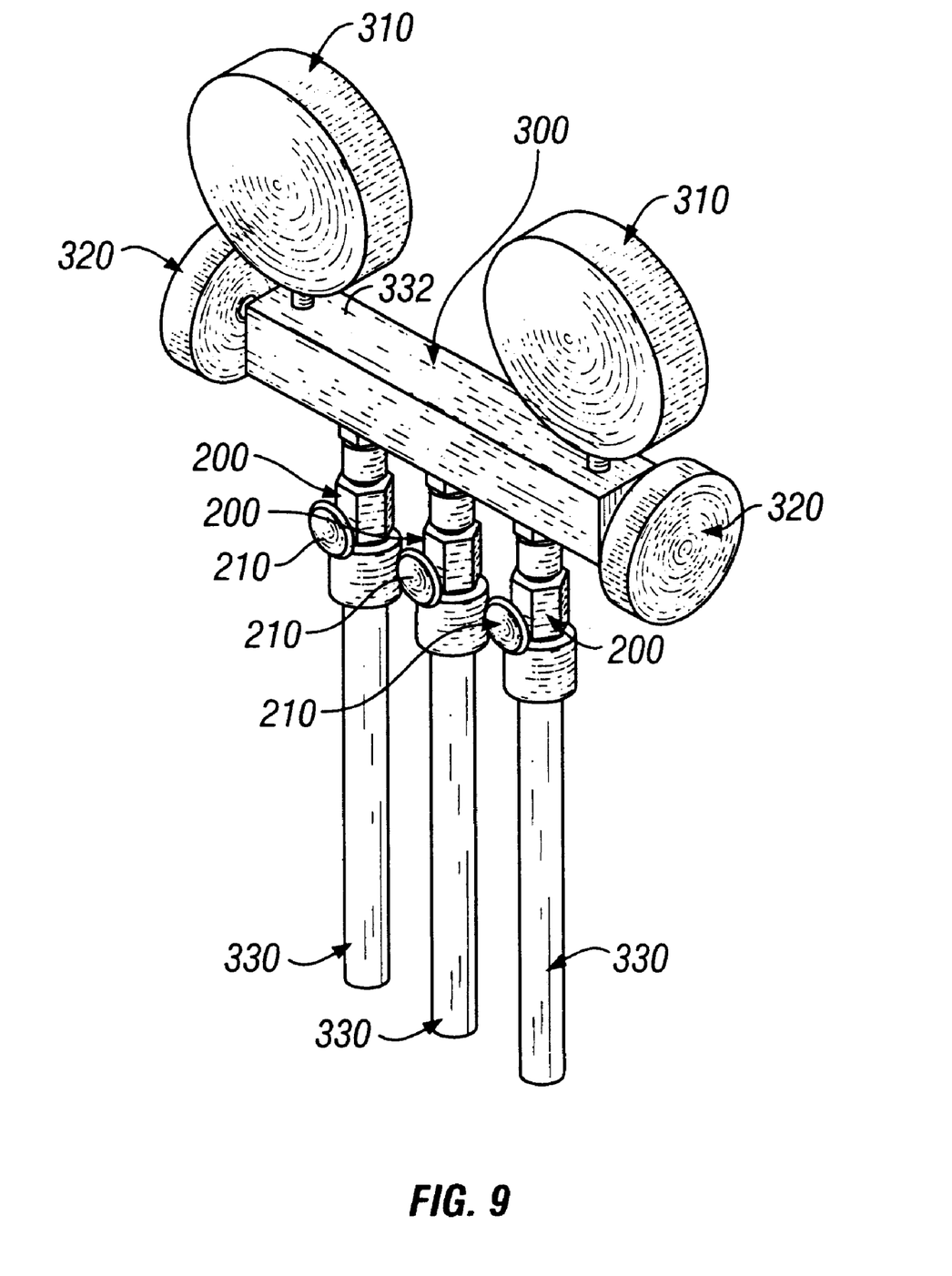
FIG. 9 is a schematic drawing depicting a view of a purge fitting attached to a service manifold.

Inlet 202 and outlet 204 can be configured to mate with R12, R134a, 14 mm, or other fittings for air conditioning or refrigeration service. Referring to FIG. 9, purge fittings 200 can be installed in existing service manifold 300, such as, for example, item M-71A6Q (CPS Products, Inc., Hialeah, Fla.). Purge fittings 200 can be attached between hoses 330 and manifold body 332 so that purge buttons 210 can be accessed at the manifold. Service manifold 300 includes pressure gauges 210 that provide pressure readings within the manifold and knobs 320 that control fluid flow through hoses 330.

Figure 10:
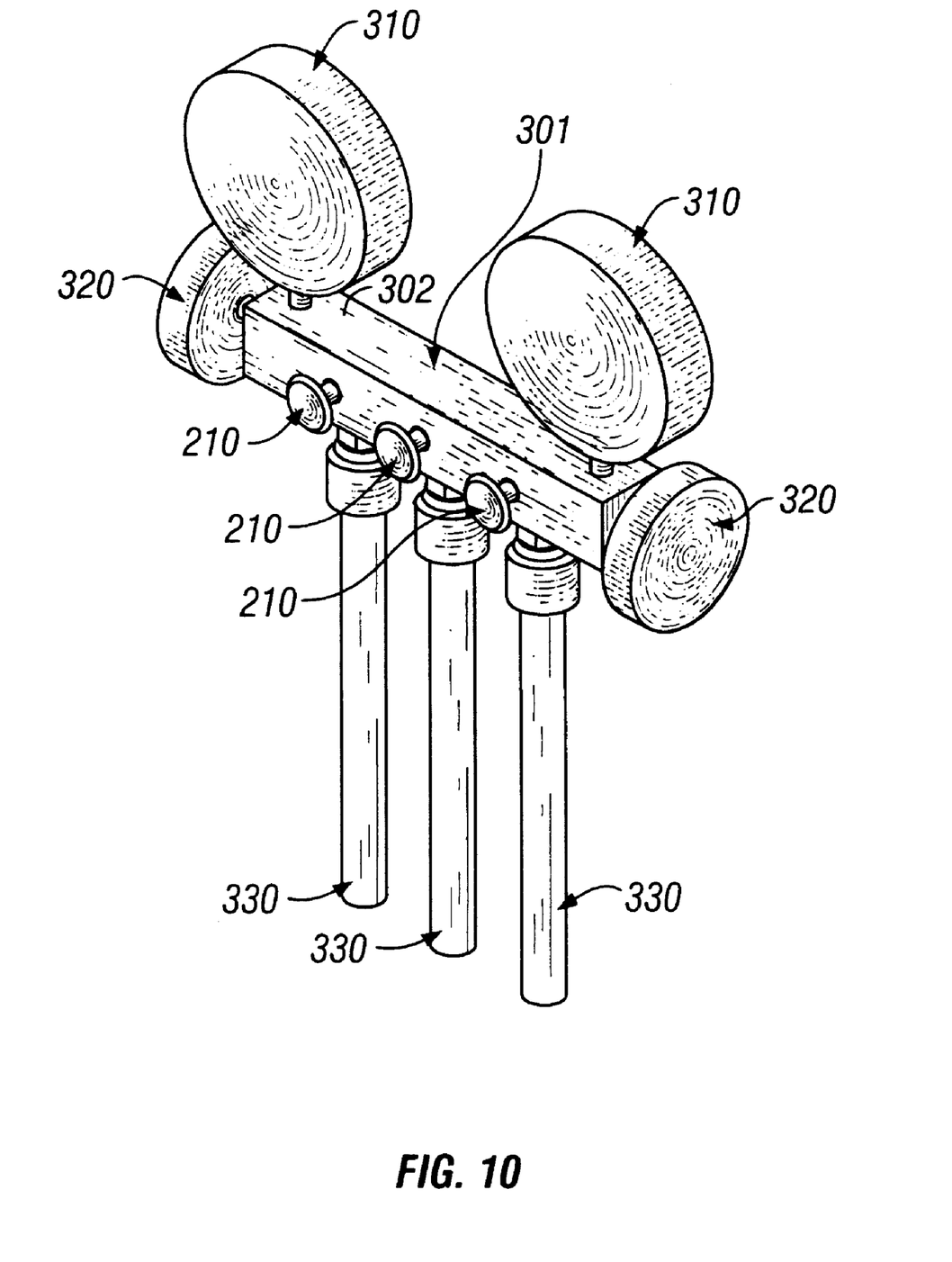
FIG. 10 is a schematic drawing depicting a view of a service manifold including a purge actuator.
Figure 11:
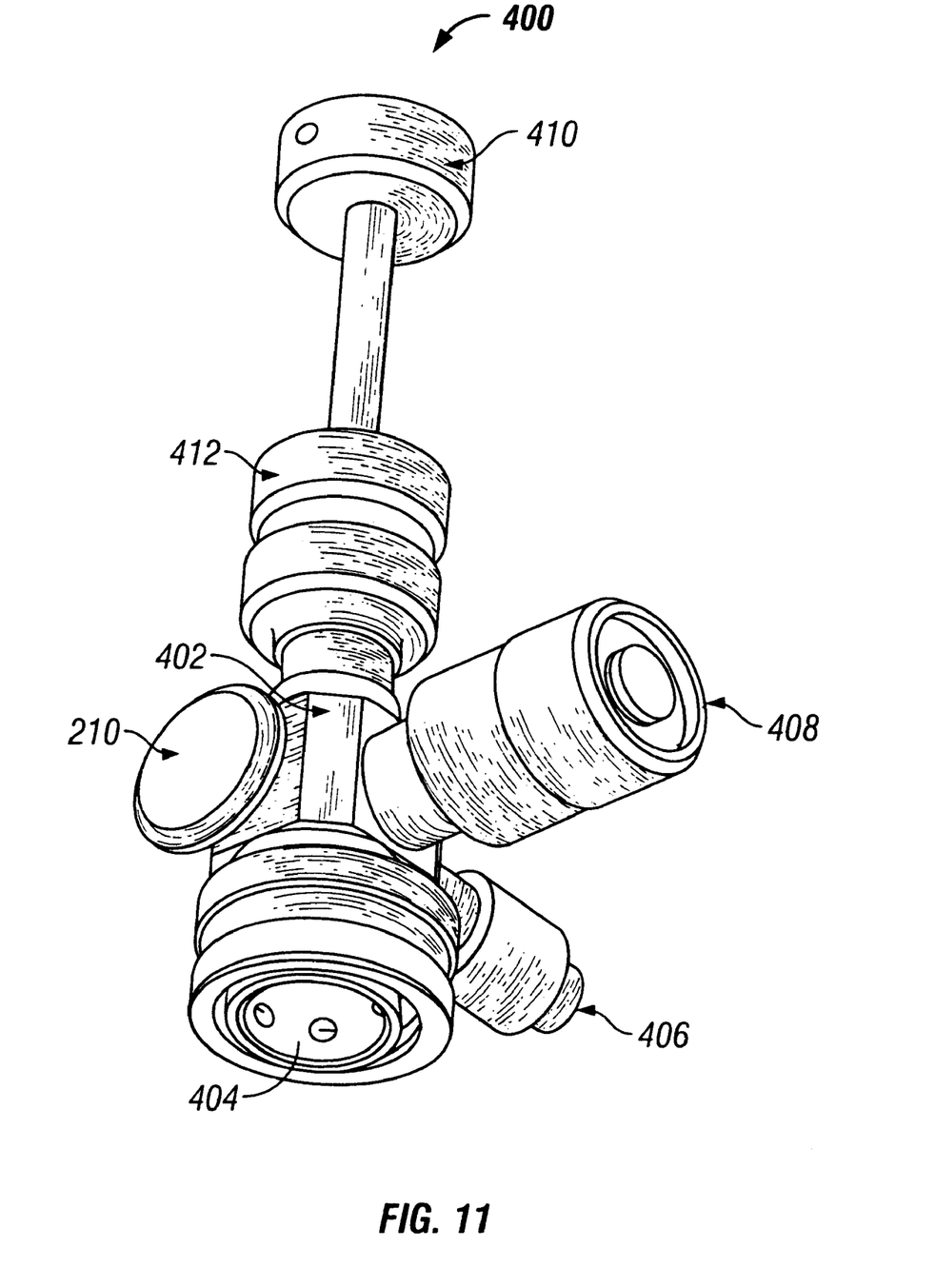
FIG. 11 is a schematic drawing depicting a view of a valve core removal tool including a purge actuator.

Referring to FIGS. 10 and 11, a purge feature can be incorporated directly into a service device, such as service manifold 301 or valve core removal tool 400. Referring to FIG. 10, a purge device can be incorporated into manifold 302, having purge buttons 210 exposed for easy access. The pressure gauges 310, knobs 320 and hoses 330 of the service manifold remain unchanged. Referring to FIG. 11, valve core removal tool 400 includes a purge; device, including purge button 210. The purge device is installed in body 402 Valve core removal tool 400 has service end 404, which attaches to a male service port (e.g., an R134a port), and service hose port 406, to which a service hose attaches. Air is vented from the service hose and the body when purge button 210 is pressed. Valve core removal tool 400 also has control knob 408 attached to body 402 that opens and closes a valve core body plug within the tool. Retraction shaft 410 is attached to body 402 by fitting 412, which seals shaft 410 to body 402. A valve core removal tool that does not include a purge feature can be modified to include a purge feature. Suitable valve core removal tools which can be modified include part CD3900 (C&D Valve Manufacturing, Oklahoma City, Okla.).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A coupling member comprising:
    a body having a first end engageable with a first valve, a second end having a moveable control member, an inner surface defining an interior chamber, and a port in fluid communication with the interior chamber;
    a pusher disposed in the interior chamber and in contact with the control member, the pusher having a valve actuation portion extending toward the first end of the body and being movable by the control member from a valve closed position to a valve open position; and
    a pin depressor proximate to the port having a first position oriented closer to the interior chamber relative to a second position which is closer to the port, the pin depressor being adapted to actuate a second valve when the second valve is positioned within the port,
    the pin depressor moving from the first position to the second position when the first valve is engaged with the first end of the body and the pusher is moved from the valve closed position to the valve open position, and
    the pin depressor being in the first position when the first end of the body is not engaged with the first valve and the pusher is moved from the valve closed position to the valve open position.

2. The coupling member of claim 1, wherein the pin depressor is movably attached to the pusher.

3. The coupling member of claim 1, wherein the pusher is engaged with threads to the control member.

4. The coupling member of claim 3, wherein the pusher moves from the valve closed position to the valve open position by rotating the control member by less than one revolution.

5. The coupling member of claim 1, wherein the second end of the body includes a groove and the control member is moveably attached to the groove.

6. The coupling member of claim 1, wherein the first end of the body includes a release sleeve assembly including an adapter connected to the first end of the body, a release sleeve over the adapter, and a spring between the release sleeve and the adapter.

7. The coupling member of claim 6, wherein the release sleeve assembly includes a plurality of balls distributed between the adapter and the sleeve, the balls being engageable with the first valve the plurality of balls includes more than six balls.

8. The coupling member of claim 1, further comprising a second valve positioned within the port, the second valve being opened when the pin depressor moves from the first position to the second position.

9. The coupling member of claim 1, further comprising a purge actuator exterior to the body, the purge actuator having a shaft extending through the interior chamber to the port, the shaft being capable of moving the pin depressor from the first position to the second position while in the valve closed position.

10. The coupling member of claim 1, wherein the coupling member has an end-to-end dimension T that is unchanged in the valve open position and in the valve closed position.

11. The coupling member of claim 1, wherein the first end is engageable with a high pressure side refrigerant port or a low pressure side refrigerant port.

12. The coupling member of claim 1, further comprising a valve detection member movably disposed on the valve actuation portion, the valve detection member moving relative to the valve actuation portion when the first valve is engaged with the first end of the body and the pusher is moved from the valve closed position to the valve open position and the valve detection member being substantially stationary relative to the valve actuation portion when the first end of the body is not engaged with the first valve, and the pin depressor moving from the first position to the second position when the valve detection member moves relative to the valve actuation portion.

13. A coupling member comprising:
a body having a first end engageable with a first valve, a second end having a moveable control member, an inner surface defining an interior chamber, and a port in fluid communication with the interior chamber, the first end of the body including a release sleeve assembly including an adapter connected to the first end of the body, a release sleeve over the adapter, and a spring between the release sleeve and the adapter;
a pusher disposed in the interior chamber and in contact with the control member, the pusher having a valve actuation portion extending toward the first end of the body and being movable by the control member from a valve closed position to a valve open position;
a valve detection member movably disposed on the valve actuation portion, the valve detection member moving relative to the valve actuation portion when the first valve is engaged with the first end of the body and the pusher is moved from the valve closed position to the valve open position and the valve detection member being substantially stationary relative to the valve actuation portion when the first end of the body is not engaged with the first valve;
a pin depressor movably attached to the pusher and proximate to the port having a first position oriented closer to the interior chamber relative to a second position which is closer to the port, the pin depressor being adapted to actuate a second valve when the second valve is positioned within the port, the pin depressor moving from the first position to the second position when the valve detection member moves relative to the valve actuation portion; and a purge actuator exterior to the body, the purge actuator having a shaft extending through the interior chamber to the port, the shaft being capable of moving the pin depressor from the first position to the second position while in the valve closed position.

14. The coupling member of claim 13, wherein the pusher is engaged with threads to the control member and moves from the valve closed position to the valve open position by rotating the control member by less than one revolution.

15. The coupling member of claim 13, wherein the second end of the body includes a groove and the control member is moveably attached to the groove.

16. The coupling member of claim 13, wherein the release sleeve assembly includes a plurality of balls distributed between the adapter and the sleeve, the balls being engageable with the first valve the plurality of balls includes more than six balls.

17. The coupling member of claim 13, further comprising a second valve positioned within the port, the second valve being opened when the pin depressor moves from the first position to the second position.

18. The coupling member of claim 13, wherein the valve detection member is movably disposed on the valve actuation portion.

19. The coupling member of claim 13, wherein the coupling member has an end-to-end dimension T that is unchanged in the valve open position and in the valve closed position.

20. A method of servicing a pressurized fluid system comprising:
attaching a coupling member to a service port of the system, the coupling member being connected to a service port of unit and including a safety valve;
contacting a portion of the service port with a valve detection member in the coupling member; and
opening the service port with the coupling member, the safety valve being opened by the valve detection member approximately when the service port is opened.

21. The method of claim 20, further comprising activating a purge actuator of the coupling member to vent air from the service unit prior to attaching the coupling member to the service port.

22. The method of claim 20, further comprising activating a purge actuator of a service unit to vent air from the service unit prior to opening the service port.

23. The method of claim 20, wherein the service port is a high pressure side refrigerant port or a low pressure side refrigerant port.

24. The method of claim 20, wherein the service unit is a recovery and recycle station.

* * * * *